May 27, 1941.                R. B. FAGEOL                2,243,462
                        SHOCK ABSORBING ELEMENT
                         Filed June 19, 1939
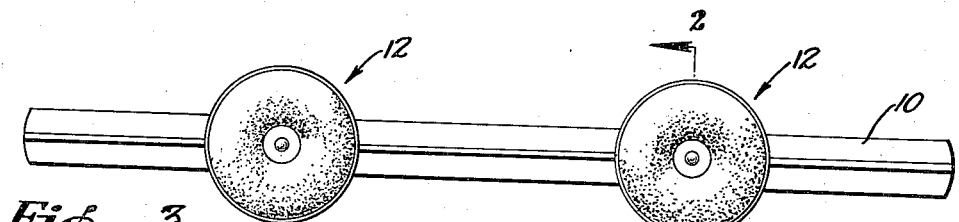
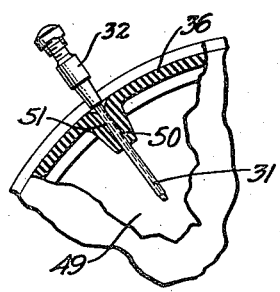
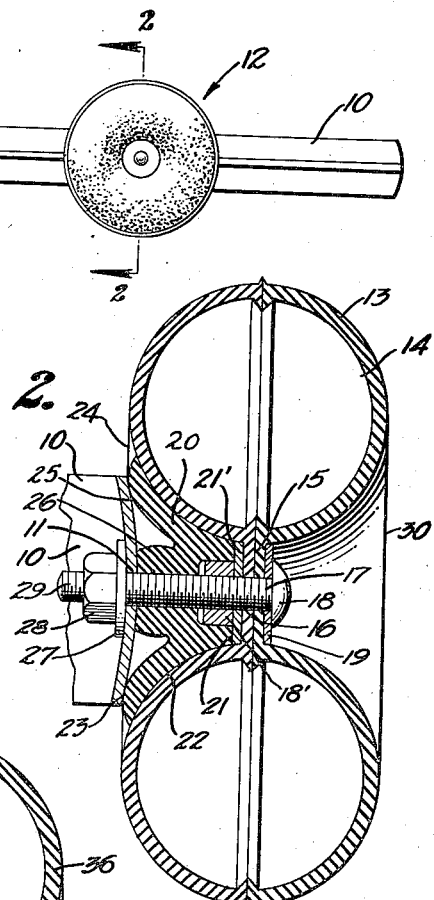
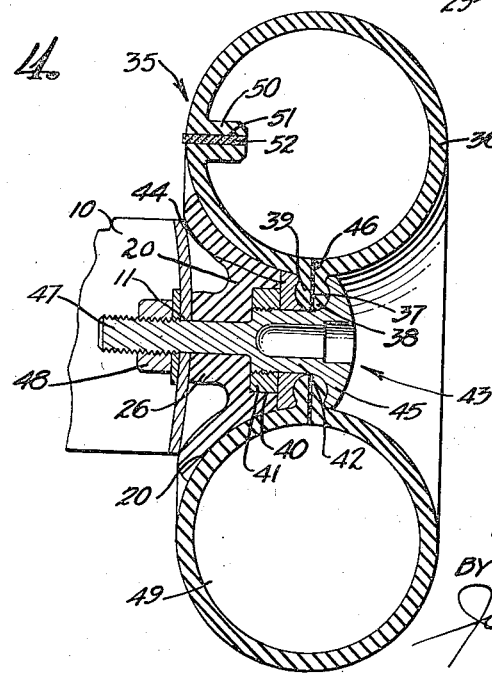
INVENTOR
ROLLIE B. FAGEOL
BY
James M. Abbott
ATTORNEY Patented May 27, 1941

2,243,462

UNITED STATES PATENT OFFICE 2,243,462

SHOCK ABSORBING ELEMENT

Rollie B. Fageol, Beverly Hills, Calif.

Application June 19, 1939, Serial No. 279,882

6 Claims. (Cl. 293—55)

This invention relates to a rubber product and particularly pertains to a shock absorbing element of the general class disclosed in U. S. Letters Patent No. 2,173,642 entitled "Non-hook, non-skid bumper construction," issued September 19, 1939.

In present day automobile bumper design it is common practice to place vertically disposed cleats transversely of the horizontal bar of an automobile bumper. This is done in an attempt to compensate for the differences in the levels of automobile bumpers on vehicles in collision. It will be evident that when the level of two bumpers on colliding vehicles is not in a coincident horizontal plane the bumpers will pass one over the other and cause the impact of collision to be transmitted to the frame of a vehicle. When, however, rigid metal cleats are used, the cleats of one bumper will encounter the horizontal bar of the other bumper even though there is a wide range of distance between the bumpers as measured from the ground. It often occurs, however, when such structures are used on vehicles and the vehicles collide that the cleats will become hooked one over the other or over the bumper bars so that there is difficulty in unhooking the bars. It is the principal object of the present invention to provide a shock absorbing element which may be used as a substitute for the cleats now applied to automobile bumpers, and which element is not only characterized as having inherent resiliency and shock absorbing qualities in itself but may yieldably flex above and below the bumper bar, whereby the members may be readily disengaged in the case that the bumpers and shock absorbing elements become entangled on colliding cars.

The present invention contemplates the provision of shock absorbing elements characterized as being supported across the impact face of an automobile bumper and extending above and below the margins of said face, the structure including a flexible inflated and deformable element which will be interposed between the bumper and the colliding object and which will absorb the shock of the impact.

The invention is illustrated by way of example in the accompanying drawing, in which:

Figure 1 is a view in front elevation showing an automobile bumper equipped with a device embodying the present invention.

Fig. 2 is a view in transverse section through the automobile bumper and the buffer therein as seen on the line 2—2 of Fig. 1.

Fig. 3 is an enlarged view in elevation showing the buffer and with a part broken away to disclose the manner in which the structure is inflated.

Fig. 4 is a view in transverse section and elevation showing another form of the invention.

Referring more particularly to the drawing, 10 indicates an automobile bumper, here shown as being of convex section and having an opening 11 therethrough. Mounted on the convex forward face of the bumper are buffer elements 12. These elements, as shown in Fig. 2 of the drawing, comprise an annular tubular portion 13 forming an annular air space 14. The circumference of the tubular portion is such as to permit an intermediate web 15 to occur at the center of the structure.

It is preferable that the buffer shall be formed completely of rubber and that the tubular portion 13 and the intermediate web 15 are molded integral. It is also desirable that the rubber be of the type known as gum rubber and that it is made without incorporating any fabric or other reinforcing member in its walls. The buffer is made in this manner so that it will yield to any force applied against it, and so that the compression of the tubular portion 13 having force exerted at any point will tend to distend and inflate the buffer at other points, thus insuring that a resilient air cushion will be interposed between the supporting member of the buffer and a body in impact therewith.

In the form of the invention shown in Fig. 2 the web 15 is provided with a central opening 16 through which a bolt 17 extends. This bolt carries a head 18, here shown as resting against a plate or washer 19, which member 19 is interposed between the head 18 and the web 15. Resting against the opposite side of the web 15 from the plate 19 is a seat cone 20 which is preferably made of rubber and through which the bolt extends. This seat cone is substantially frusto-conical in shape, having an end face 21 resting against a washer 21' and an outwardly flaring face 22 which conforms to the concave face of the tubular portion 13 of the buffer. A nut 18' clamps the washers 19 and 21' against the opposite faces of web 15. The thickness of the cone is such as to cause the outer edge 23 of the cone to lie in substantially the same plane as the back vertical face 24 of the buffer, thus under normal conditions the back vertical face 24 of the buffer and the edge 23 of the cone rest against the front face 25 of the bumper.

The cone is formed with a central hub 26 which abuts against the impact face 25 of the bumper and against which a washer 27 rests. This washer is held in position by a nut 28 on the bolt 29. It will therefore be seen that when the nuts 18' and 29 are made tight the cone will be held against the front face 25 of the bumper and the buffer 13 will be secured in place. When the front face 30 of the buffer encounters an object in impact therewith the tubular portion 13 will be compressed laterally and will expand circumferentially, and the outwardly flaring walls of the cone portion will flex as the hub 26 moves against the face of the bumper. It will be further evident that since force of impact may not be delivered uniformly over the face 30 of the buffer, or centrally thereof, that the buffer will be flexed and distorted in a manner to accommodate this impact while the remaining portion of the buffer is distended in direct proportion to the expansive action and the distorting force of the blow.

The buffer 12 is intended to be inflated by some simple means which will seal the space 14 and maintain the tubular portion 13 in its inflated position. This is done by inserting a tubular needle 31 through the wall of the tubular member 13, the needle being carried as a part of a valve structure 32 of usual type having a check valve which will hold the air and prevent it from passing outwardly from the tubular member. It is preferable that some sort of adhesive such as rubber cement, or various puncture sealing liquids, shall be placed within the tubular member 13 in sufficient quantity to close the perforation made in the wall of this member when the needle is withdrawn. In this way the tubular member will be permanently sealed and will confine air within the structure at a desired pressure as well as prevent the release of air when greater pressure is created by impact.

Referring more particularly to Fig. 4 of the drawing it will be seen that the annular body portion 35 of a bumper structure is provided having a wall 36 substantially of circular cross-section, the diameter of the circular section being less than one-half of the outside diameter of the entire structure 35. The wall portion 36 is split, as indicated at 37, and is formed with inner marginal beads 38 and 39. These beads are semicircular in section and circular in general formation. The beads when drawn together provide an intermediate web having the function of the web 15 shown in Fig. 2 of the drawing. Fitting within the concave central portion of the bumper structure 35 on the side contiguous to the automobile bumper 10 is a cone-shaped seat 20, as previously described. This seat is here shown as formed with the central hub 26 which extends through opening 11 in the bumper bar. The opposite face of the cone is counterbored, as indicated at 40, and receives a threaded nut 41. The nut 41 is mounted upon an enlarged shoulder 42 of the fastening bolt structure 43. This nut bears against a clamping ring 44 which has a concave face to accommodate the bead portion 39. The bolt 43 is formed with an enlarged head 45 having a concaved under face to agree with the bead 38. Thus, when the nut 41 is tightened against the clamping washer 44 the bead portions 38 and 39 will be drawn together and a layer of adhesive 46 will cause the abutting faces of the split 37 to be joined and held air-tight. At the rear of the bolt structure 43 is a reduced threaded section 47 which receives a nut 48. This holds the fastening cone 20 and the assembled structure 35 in operative position upon the face of the bumper.

As previously explained, the annular compartment 49 which is circumscribed by the wall 36 is inflated to a desired pressure by the use of the valve structure 32 and the needle member 31. This member is preferably forced through a boss 50 formed in the wall of the shock absorbing structure and having a central opening 51 filled with a soft rubber core 52 through which the needle 31 may be forced and which core will close in when the needle is withdrawn to form a seal within the structure.

In the form of the invention shown in Fig. 2 of the drawing a method of manufacturing the buffer elements 12 is followed which makes it necessary to form the tubular portion 13 in two halves divided along a transverse plane normal to the center of the annular air space 14.

In the form of the invention shown in Fig. 4 of the drawing the entire buffer structure 35 is formed around a mold, after which the mold is withdrawn.

It is to be understood that while the buffer elements 12 and 35 are described as being circular that variations in the shape may take place, without departing from the spirit of the invention. It is desirable, however, that the outside diameter or overall dimension of the perimeter of the buffer elements shall be such as to insure that the buffer elements are wider than the width of the bumper bar upon which they are mounted, and that the shape of the buffer elements is such as to cause the impact surface of the element to lie in a vertical plane in advance of the fastening means, whereby the buffer may be compressed and deformed materially without causing the force of impact to be directly imposed upon the fastening means and the bumper supporting it.

In operation of the present invention the buffers 12 or 35 are constructed as here shown and inflated to a suitable degree. In actual practice it has been found that an air pressure of 5 to 8 pounds is adequate. The buffers are then mounted upon the vehicle with the rubber cones 20 disposed with their bases resting against the face of the buffer bar 10 and overhanging the horizontal marginal edges thereof. The buffers themselves are mounted on the frusto-conical parts of the cones and are secured by the bolts shown in either Fig. 2 or Fig. 4. In impact the buffers will be deformed in response to an impact force delivered against them, and since the buffer structures 12 and 35 are made of rubber devoid of non-stretching fabric reinforcing means it is evident that the walls of the bumper will stretch in a plane substantially at right angles to the direction of force imposed upon the bumper. Thus, if the buffer is struck "head on" the wall sections will tend to assume an elliptical shape, making the device of a lesser overall thickness while increasing its outside diameter. It will also be evident that since the cone 20 is made of resilient material there will be a tendency for it to flex, and when it is mounted with its central hub extending through the opening 11 in the bumper bar 10 additional resilience will be given to the bumper structure. In actual practice it has been found that any "head on" impact of a bumper equipped with the buffers here shown may take place up to a speed of at least twelve miles an hour before the buffer structure has been sufficiently deformed and flexed to cause the colliding object to strike the head of the bolts 17 or 23.

Attention is particularly directed to the fact that while the buffers embodying the present invention are substitutes for cleats which extend above and below the horizontal marginal edges of the bumper that these buffer structures provide a resilient substitute therefor and in extreme impact will ride over a marginal edge of the bumper bar rather than bend, and when the vehicles are moved apart there is no difficulty in causing the buffers to flex in an opposite direction and to permit the bumpers of the two vehicles to be quickly disentangled.

In the manufacture of the rubber structure here disclosed suitable molds are made, within which the rubber structure is formed having an annular tubular portion, providing an air space and an intermediate web by which the structure is held. The annular tubular portion and the web are preferably formed of gum rubber having desired stretchability and desired flexibility; thus, when force is applied either to the circumference of the tubular member or against a face thereof the air which is sealed within the space 14 will be compressed, and the tubular member at other points than that at which pressure is applied will be distended to cushion and absorb the force of impact while the walls of the structure resiliently resist this force and act to restore the tubular structure to its normal position and shape when pressure is relieved.

When the structure is used as a buffer on automobile bumpers it will absorb the force of impact, and in the event that contact with the colliding object does not take place centrally of the buffer it will be evident that the buffer is free to flex on the web portion without injury. It will also be evident that in case the marginal edge of the buffer should slide over the edge of a bumper colliding therewith the buffer would temporarily interlock with the colliding bumper but could be readily freed since the buffer is flexible and could be distorted to move to a released position.

It will thus be seen that the structure here disclosed is simple in design and construction, may be manufactured inexpensively and will act universally under impact to resist force yieldably and may be readily disentangled without damage to the device or the colliding object.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. An article of manufacture made of rubber and comprising an annular tubular member within which air is sealed, said tubular portion being formed integral with an intermediate web by which the structure is mounted for use, the web lying in a plane at right angles to the central axis of the tubular member and equatorially thereof and fastening means disposed centrally of said web and by which the article may be secured across the front face of an automobile bumper.

2. A buffer structure for automobile bumpers comprising an annular tubular member within which air is sealed, the tubular section of said member being substantially circular, a web formed integral with the circumferential wall of said member in the plane of the equator thereof, a fitting on one side of said web made of yieldable material and resting against an object upon which the structure is mounted, and fastening means extending through the fitting and the web for supporting the structure.

3. A buffer structure for automobile bumpers comprising an annular tubular member within which air is sealed, the tubular section of said member being substantially circular, a web formed integral with the circumferential wall of said member in the plane of the equator thereof, a fitting on one side of said web made of yieldable material and resting against an object upon which the structure is mounted, one end of said fitting resting against the web, the other end of the fitting resting against a supporting element having an opening therethrough, a hub on the fitting projecting through said opening, and fastening means securing the fitting upon the support with the hub extending through said opening.

4. A buffer structure for automobile bumpers comprising an annular tubular member within which air is sealed, the tubular section of said member being substantially circular, a web formed integral with the circumferential wall of said member in the plane of the equator thereof, a fitting on one side of said web made of yieldable material and resting against an object upon which the structure is mounted, said fitting being substantially frusto-conical in shape, with one end of said fitting resting against the web, the other end of the fitting resting against a supporting element having an opening therethrough, a hub on the fitting projecting through said opening, and fastening means securing the fitting upon the support with the hub extending through said opening.

5. In combination with the horizontal bar of an automobile bumper, a frusto-conical fitting made of rubber and being disposed with its base portion resting against the impact face of the bumper bar, a minimum diameter of the base being equal to the vertical width of the bar, a buffer element having a concaved portion fitting over said frusto-conical member and being formed with an air chamber confined within flexible resilient rubber walls of a greater overall vertical dimension than that of the base of the frusto-conical member, the forward face of said buffer being in advance of the frusto-conical member, and fastening means passing through the buffer, the frusto-conical member and the bumper whereby the buffer will be secured in position upon the impact face of the bumper.

6. In combination with an automobile bumper including a horizontal bar, a resilient frusto-conical member having a central hub portion abutting against the impact face of the bumper bar and an annular flange portion resting against the impact face, a washer disposed against the small diameter of said frusto-conical member, a resilient buffer element, the central portion of which rests against the washer, a second washer resting against the front face of the resilient element, a bolt passing through the resilient element, the two washers and extending longitudinally through the hub of the frusto-conical member, a nut on the bolt clamping the two washers against the opposite faces of the buffer element, and a nut securing the bolt through the bumper bar.

ROLLIE B. FAGEOL.